Feb. 21, 1967 W. C. HYND 3,305,333
MANUFACTURE OF WIRED GLASS
Filed Feb. 4, 1963 3 Sheets-Sheet 1
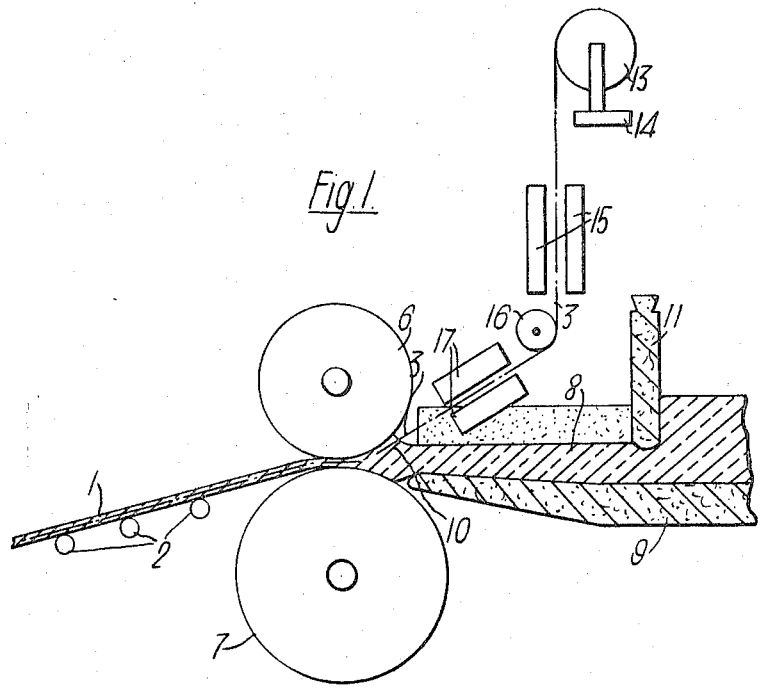
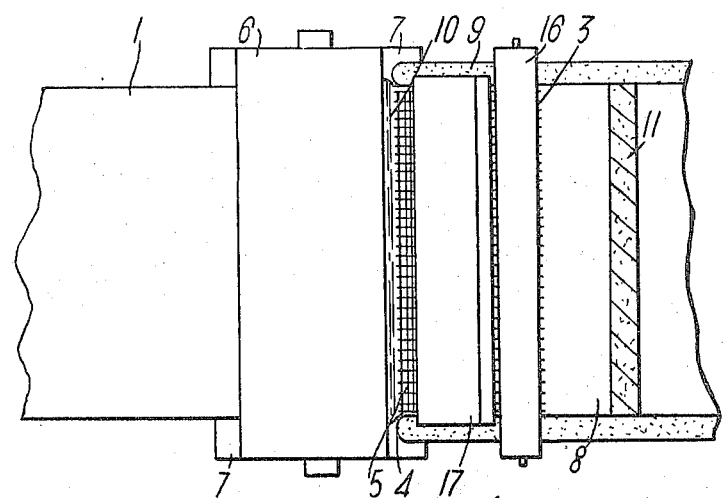
Inventor
William Christie Hynd
By
Morrison Kennedy & Campbell
Attorneys Feb. 21, 1967 W. C. HYND 3,305,333
MANUFACTURE OF WIRED GLASS
Filed Feb. 4, 1963 3 Sheets-Sheet 2
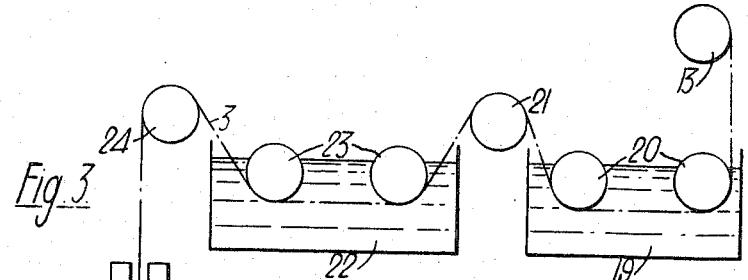
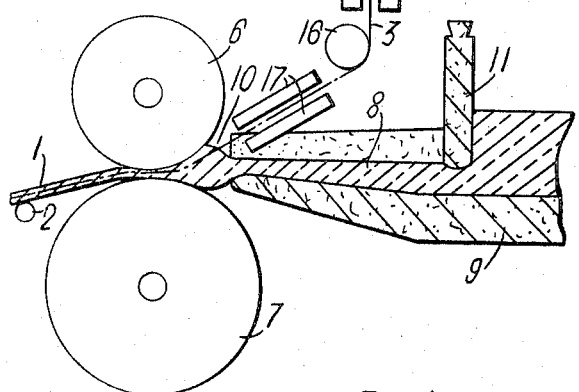
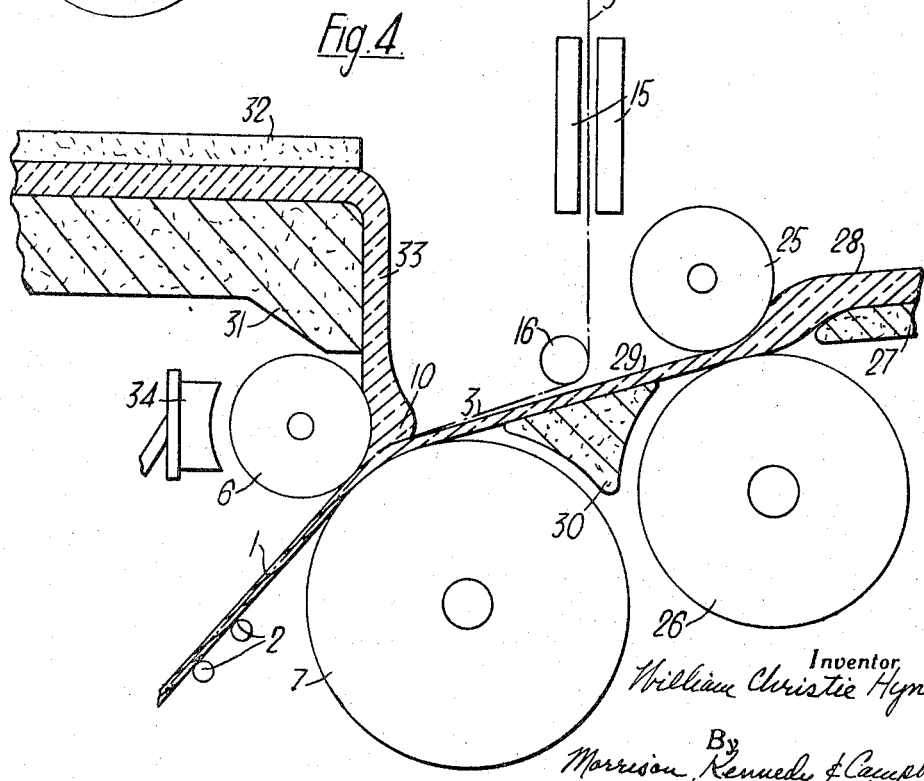
Inventor
William Christie Hynd
By Morrison, Kennedy & Campbell
Attorneys

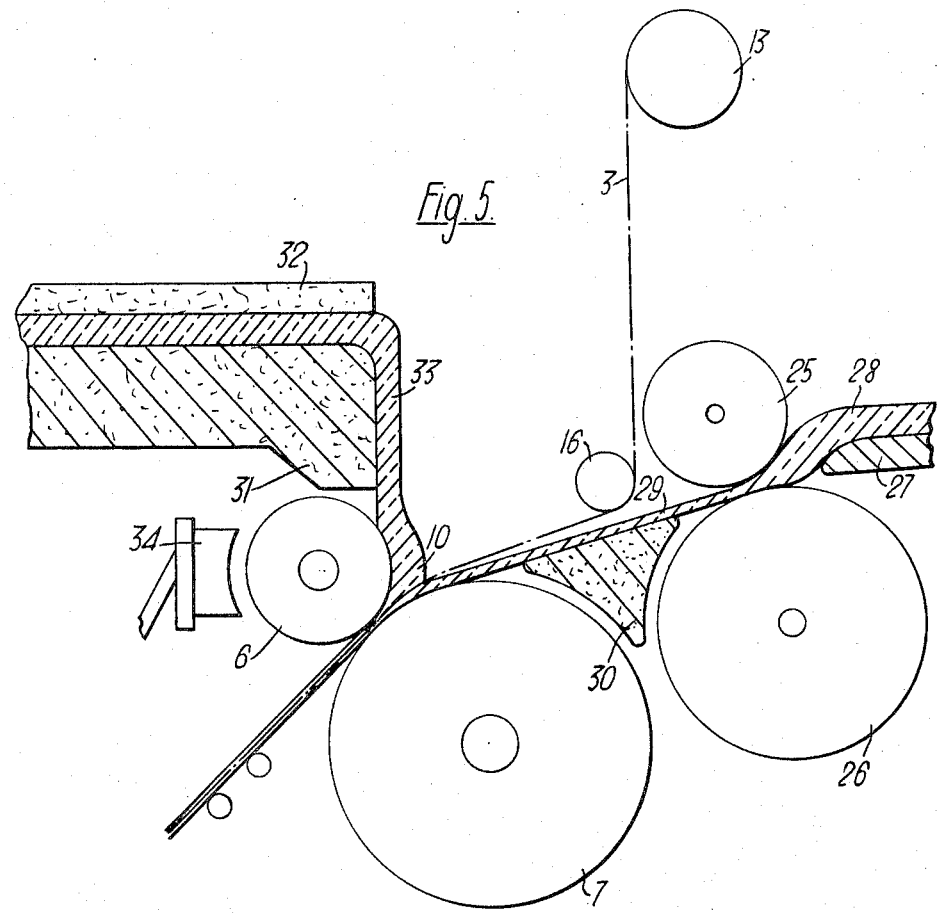

3,305,333
MANUFACTURE OF WIRED GLASS
William Christie Hynd, Liverpool, England, assignor to Pilkington Brothers Limited, Liverpool, England, a corporation of Great Britain
Filed Feb. 4, 1963, Ser. No. 255,933
Claims priority, application Great Britain, Feb. 8, 1962, 4,953/62
4 Claims. (Cl. 65—32)

This invention relates to a method and apparatus for continuously manufacturing a ribbon of wired glass. In particular the invention relates to the manufacture of a ribbon of wired glass in which a wire web consisting of longitudinal and transverse wires welded at their intersections and respectively extending along and across the ribbon is incorporated in the ribbon. Wire web of this kind in which mesh is rectangular is usually called "Georgian" wire web.

In the usual process for the manufacture of a ribbon of wired glass, "Georgian" wire web is fed into molten glass from which the ribbon is formed and there is a sudden linear expansion of each transverse wire in turn as it becomes completely immersed throughout its length in the molten glass. This expansion is so great that deformation of the transverse wires results because the web is unable to take up strain caused by the sudden expansion of one transverse wire when the adjacent following comparatively cold wire remains rigid as does the preceding expanded wire which is already anchored in the glass.

The deformation of the transverse wires takes the form of a buckling, for example between the longitudinal wires and when the rolled ribbon of wired glass is formed these deformations are bent backwardly to produce in the wired glass an effect known as "feather."

Heating of the wire web before it is fed into the molten glass leads to difficulties because any oxide or other contaminant formed on the web during the heating will cause discoloration of the glass around the web in the formed ribbon and may also give rise to reactions with the glass to form bubbles around the wires in the finished ribbon. In particular, when employing steel wire web, black iron oxide on the web discolours the glass and spoils the appearance of the glass.

It is a main object of the present invention to overcome these disadvantages in the manufacture of wired glass, that is to avoid "feather" by permitting free expansion of the wire web before it is fed into the molten glass from which the ribbon is formed, without spoiling the appearance of the finished ribbon of wired glass.

According to the invention a method of continuously manufacturing a ribbon of wired glass comprises continuously incorporating into molten glass from which the ribbon of glass is formed, a wire web consisting of longitudinal and transverse wires welded at their intersections and respectively extending along and across the ribbon, heating the web under conditions protecting the wires from oxidation as the web is advanced for incorporation into the ribbon, said heating being such that the relative expansion between adjacent transverse wires at any time during the heating and when the web is incorporated into the ribbon is insufficient to cause deformation of the web.

Preferably the web is gradually heated to the temperature of the molten glass. Desirably the conditions protecting the wire from oxidation comprise the application of a protective coating to the wire web.

Further, the invention comprehends a method of continuously manufacturing a ribbon of wired glass in which a coated wire web is incorporated in the ribbon as the ribbon is formed, the web coating being a protective coating suitable for protecting the wire from oxidation as it is heated prior to incorporation into the ribbon.

Preferably "Georgian" wire web is employed, that is said coated wire web consists of longitudinal and transverse wires welded at their intersections and respectively extending along and across the ribbon.

In a preferred embodiment of the invention the coating on the wire web is a protective phosphate coating for the wires.

The wire web may be coated in a separate plant and then stored for use as rolls of coated wire web. Alternatively the wire web may be coated with its protective coating and the coated web then fed into the molten glass from which the ribbon is formed, and from this aspect the invention provides a method of continuously manufacturing a ribbon of wired glass comprising coating a wire web consisting of longitudinal and transverse wires welded at their intersections, with a coating for protecting the wires from oxidation, continuously incorporating the coated web into the ribbon of glass as it is formed so that the longitudinal and transverse wires respectively extend along and across the ribbon, and gradually heating the coated web as it is advanced for incorporation into the ribbon in such a way that the relative expansion between adjacent transverse wires of the web at any time during the heating is insufficient to cause deformation of the web.

In a preferred embodiment of the invention the coated wire web is gradually heated by radiant heat as it is advanced for incorporation into the ribbon.

According to one embodiment of the invention a method of continuously manufacturing a ribbon of wired glass in which a coated wire web consisting of longitudinal and transverse wires welded at their intersections and respectively extending along and across the ribbon, and having a coating for protecting the wire from oxidation, is fed into the molten glass from which the ribbon is formed, comprises continuously forming a ribbon component of glass, producing on the ribbon component a bolster of molten glass, feeding the coated web into one side of the bolster, gradually heating the coated wire web by radiant heat as the web is advanced towards the bolster so that the relative expansion between adjacent transverse wires at any time during said gradual heating and when the web enters the molten glass, is insufficient to cause deformation of the web, and rolling the ribbon of wired glass from the other side of the bolster.

The coated wire web may be fed from the radiant heaters directly into a bolster of molten glass supported just in front of the pass between a pair of casting rolls. Alternatively the ribbon of wired glass may be formed by continuously forming a ribbon component of glass, producing on the ribbon component a bolster of molten glass, feeding the coated web into one side of the bolster along a path adjacent and substantially parallel to the upper surface of the ribbon component so that the coated web is gradually heated by radiant heat from the ribbon component as it is advanced towards the bolster, the relative expansion between adjacent transverse wires at any time during said gradual heating and when the web enters the molten glass being insufficient to cause deformation of the web, and rolling the ribbon of wired glass from the other side of the bolster.

The coated wire web employed according to the invention is preferably a web of steel wire coated with a protective coating of zinc phosphate or calcium metaphosphate.

The invention also comprehends a ribbon of wired glass comprising a coated wire web incorporated in the ribbon, the web coating being a coating for protecting the wires from oxidation.

Preferably the coated wire web is a steel wire web coated with a protective coating of zinc phosphate or calcium metaphosphate.

A ribbon of wired glass according to the invention has a characteristic pleasant appearance since there is no discolouring of the glass due to contaminants on the wire, and any reaction of the coating with the glass does not colour the glass even if the coating becomes incorporated in the glass during the formation of the ribbon. Further, because of the gradual heating of the wire web under non-oxidising conditions there is no thermal shock to the web when it enters the molten glass, and the form of the web is preserved in the ribbon of glass. In the case of "Georgian" wire web the rectangular form of the mesh is preserved in the finished ribbon.

The invention also provides apparatus for continuously manufacturing a ribbon of wired glass in which a wire web consisting of longitudinal and transverse wires welded at their intersection and respectively extending along and across the ribbon and having a coating for protecting the wire from oxidation, is incorporated in the ribbon, comprising means for forming a ribbon of glass from molten glass, feeding means associated with said ribbon forming means for feeding the coated wire web into the molten glass for incorporation into the ribbon as the ribbon is formed, and heating means for heating the coated wire web as it is fed, in such a way that the relative expansion between adjacent transverse wires at any time during the heating is insufficient to cause deformation of the web.

The coating may be applied to the wire web in a separate plant and rolls of coated web then used in the glass ribbon manufacturing apparatus. Alternatively apparatus according to the invention includes means for continuously coating the wire web with said protective coating prior to feeding into the molten glass.

In this embodiment, for coating a wire web formed of steel wire, the coating means may comprise a bath of phosphoric acid containing zinc phosphate or calcium metaphosphate through which the iron wire web is passed for coating, and means for rinsing any excess bath liquid from the coated web.

Preferably radiant heaters are associated with said wire web feeding means, to heat the coated wire web gradually to the temperature of the molten glass as the web is advanced. Alternatively the radiant heaters heat the coated wire web to a temperature such that it does not become deformed when it enters the molten glass.

In another embodiment of the invention the ribbon forming means comprises a pair of casting rolls and means for supplying molten glass to the pass between the casting rolls, the feeding means is arranged to feed the coated wire web into said molten glass, and radiant heaters are arranged on either side of the path of the web as it is fed to heat the coated wire web gradually to the temperature of the molten glass.

A heated guide roller may be spaced from the pass between said casting rolls, over which roller the coated wire web is fed and thereby directed between said radiant heaters, the web being fed downwardly to said guide roller between additional radiant heaters mounted on either side of the downward path of the coated web.

In a further embodiment of the invention the ribbon forming means comprises a first pair of casting rolls arranged to be fed with molten glass and to cast a ribbon component on to a supporting apron which extends between said first casting rolls and a second pair of casting rolls, and a spout arranged to pour molten glass on to said ribbon component to form a bolster of molten glass in front of the pass between said second rolls, the feeding means is operable to feed the coated wire web into said bolster for incorporation into the ribbon cast by said second casting rolls, and radiant heaters are arranged on either side of the path of the web.

Further according to the invention the ribbon forming means may comprise a first pair of casting rolls arranged to be fed with molten glass and to cast a ribbon component on to a supporting apron which extends between said first casting rolls and a second pair of casting rolls, and a spout arranged to pour molten glass on to said ribbon component to form a bolster of molten glass in front of the pass between said second rolls, and the feeding means includes a heated guide roller so mounted above the supporting apron that the coated wire web fed downwardly to and around the roller is thereby directed into a path adjacent and substantially parallel to the surface of the ribbon component so that the web is gradually heated by radiant heat from the ribbon component.

In this latter embodiment radiant heaters may be arranged on either side of the path of the coated web as it is fed downwardly to the heated guide roller.

In order that the invention may be more clearly understood some embodiments thereof will now be described, by way of example, with reference to the accompanying diagrammatic drawings in which:

FIGURE 1 is a central sectional elevation of apparatus according to the invention for continuously manufacturing a ribbon of wired glass, FIGURE 2 is a top plan, partly in section, of part of the apparatus of FIGURE 1, FIGURE 3 is a modified form of the apparatus of FIGURES 1 and 2, showing the continuous coating of a wire web as it is advanced for incorporation into the ribbon of glass, FIGURE 4 is a central sectional elevation through another embodiment of apparatus according to the invention, and FIGURE 5 illustrates a simplified form of the apparatus of FIGURE 4.

In the drawings the same reference numbers indicate the same or similar parts.

Referring to FIGURES 1 and 2 of the drawings, a ribbon 1 of wired glass supported on rollers 2 is continuously manufactured according to the invention by continuously forming a ribbon of glass and feeding wire web 3 into the ribbon as it is formed.

The web which is incorporated in the ribbon is illustrated in FIGURE 2 and in this embodiment consists of longitudinal wires 4 and transverse wires 5 welded at their intersections and respectively extending along and across the finished ribbon 1. Wire web of this kind which has rectangular mesh is normally referred to as "Georgian" wire web.

In the embodiment of FIGURES 1 and 2 the ribbon forming means includes a pair of casting rolls 6 and 7, and molten glass 8 is fed to the pass between the casting rolls 6 and 7, over a forehearth 9. A small bolster 10 of molten glass is formed in front of the pass between the rolls 6 and 7. The flow of molten glass over the forehearth 9 is regulated by a tweel 11 so that the flow of molten glass 8 is commensurate with the rate of formation of ribbon 1 of wired glass.

The wire web 3 to be incorporated into the ribbon 1 is, for example, a web formed of steel wires and in order to prevent any deformation of the wires of the web as it is fed into the molten glass bolster 10, the web 3 is gradually heated to the temperature of the molten glass, or to a temperature such that the web is not deformed when it enters the molten glass, under conditions protecting the wires from oxidation. To this end the wires of the web are coated with a protective coating to prevent oxidation of the wires during the gradual heating of the web, the coating being of a material which does not decompose during the gradual heating, and is such that it does not discolour the glass when the wires of the web enter the molten glass so that the appearance of the wires and the glass and the rectangular shape of the mesh of the web are preserved in the finished glass.

A suitable protective coating for the conditions prevailing during the manufacture of wired glass has been found to be a coating of zinc phosphate or calcium metaphosphate which may be applied by a phosphating process of the well-known kind. In such a process cleaned steel wire web is immersed in a bath containing phosphoric acid and zinc phosphate or calcium metaphosphate, and the wire web emerging from the bath has a protective coating of zinc phosphate or calcium metaphosphate. This coated wire web is then thoroughly rinsed and dried to remove all traces of the bath liquid and re-rolled into rolls so that it can be conveniently handled and mounted for feeding into the ribbon of glass as it is formed. It has also been found in practice that a phosphating solution sold under the name "Paroxite" (registered trademark) will produce on steel wire web a suitable protective coating for the wires.

Because the coating so produced is stable as the wire is heated and protects the steel wires against oxidation, the coated wire web can be gradually heated as it is fed towards the bolster 10 of molten glass, and as this heating is carried out without any transverse constraint, free expansion of the transverse wires is permitted. The gradual heating is so controlled that the relative expansion between adjacent transverse wires 4 of the web at any time during the heating is so small that it does not cause deformation of the web.

In the embodiment of FIGURES 1 and 2 a roll 13 of coated wire web is mounted on a stand 14 and the wire web 3 is unrolled from the roll 13 and passes downwardly between radiant heaters 15 mounted on either side of the path of the web 3. The web 3 then passes over a heated guide roller 16 which directs the web between further radiant heaters 17 mounted on either side of the path of the web as it is fed from the guide roller 16 into the bolster 10 of molten glass.

The heating of the web by the radiant heaters 15, the heated guide roller 16 and the radiant heaters 17 is so gradual that there is no deformation of the web, and because of the protective phosphate coating on the web there is no oxidation of the web as it is heated.

There is no discoloration of the glass by the coating as the heated expanded web 3 is fed into the bolster 10. The rectangular form of the mesh of the web is preserved in the ribbon 1 of wired glass, and the presence of the coating on the wire web in the finished ribbon 1 does not detract from the appearance of the ribbon.

Although in the embodiment illustrated in FIGURES 1 and 2 the coated wire web 3 is fed from a roll 13 of coated web, the apparatus of FIGURES 1 and 2 may be modified to include means for coating the wire web and then continuously feeding the coated wire web from the coating means through the radiant heaters 15 and 17 into the bolster 10 of molten glass.

This aspect of the invention is illustrated in FIGURE 3 which shows a reel 18 of uncoated steel wire web which web is fed into a phosphating bath 19, the web passing under rollers 20 immersed in the bath 19. The coated web 3 emerging from the bath 19 passes over a jockey roller 21 and then into a rising bath 22 under rollers 23 in the rinsing bath. The coated web is dried as it emerges from the rinsing bath, and passes over a roller 24 and is fed between the radiant heaters 15 where the gradual heating of the coated web to the temperature of the molten glass begins.

Another method according to the invention for continuously manufacturing a ribbon of wired glass is illustrated in FIGURE 4. The ribbon forming means includes a first pair of casting rolls 25 and 26 which are mounted in front of a forehearth 27 which feeds molten glass 28 to the pass between the rolls 25 and 26. The casting rolls 25 and 26 cast the ribbon component 29 of glass on to a supporting apron 30 which extends between the casttin rolls 25 and 26 and a second pair of casting rolls, namely the rolls 6 and 7 which roll the ribbon 1 of wired glass.

Above the upper roll 6 of the second pair of rolls is the lip 31 of a spout having side walls 32. The spout extends from a tank of molten glass of the same composition as the glass 28, and the spout pours molten glass 33 over the upper roll 30 to form a straight bolster 10 of molten glass on the ribbon component 29 in front of the pass between the rolls 6 and 7.

The coated wire web 3 is fed from the roll 13 between radiant heaters 15 mounted on either side of the downward path of the coated wire web 3. The web 3 then passes around the heated guide roll 16 which is so mounted above the supporting apron 30 that the coated wire web 3 is directed into a path substantially parallel to the surface of the ribbon component so that, following the gradual heating of the web by the radiant heaters 15 and the roller 16, the gradual heating of the web to the temperature of the molten glass is continued by radiant heat from the ribbon component 29. A cooler 34 is mounted adjacent the upper roll 6 to prevent this roll from becoming overheated.

In a simplified form of this embodiment of the invention, illustrated in FIGURE 5, no radiant heaters are employed, and the heated guide roller 16, which may be heated electrically or by hot air, is spaced from the bolster 10 by a distance which is such that the coated web is further gradually heated by radiant heat from the ribbon component 29, without causing any deformation of the web. There will be some gradual heating of the coated wire web 3 as it is fed downwardly to the roller 16 because of heat radiated from the molten glass 33 flowing over the spout lip 31. Because the wire web has a protective coating there is no need to shield the web from any heat radiated from the furnace and the molten glass flowing from the furnace along and over the spout 31, 32 or over the forehearth 27.

Although the spout 31, 32 as illustrated produces a straight bolster 10 of molten glass, the shape of the bolster may be modified, for example a tapered bolster may be employed, the final heating of the wires as they enter the glass then being effected by the bolster progressively along the length of the transverse wires.

When the flat ribbon 1 has been annealed it may be finished by grinding and polishing the surfaces of the ribbon to remove surface imperfections. Alternatively, surface imperfections on the ribbon may be removed by treating the hot ribbon on a molten bath as described in United States Patent No. 2,911,759. If patterned wired glass is to be produced the casting rolls 6 and 7 have correspondingly patterned surfaces.

Although the invention has been described above with reference to the production of flat glass, the invention also comprehends the processing of the ribbon of wired glass after it leaves the casting rolls 6 and 7. For example, the ribbon 1 may be passed through shaping means before it stiffens, to produce a corrugated ribbon of wired glass.

The invention also comprehends a ribbon of wired glass comprising a coated wire web incorporated in the ribbon, the web coating being a coating for protecting the wires from oxidation. There is no discoloring or spoiling of the pleasing appearance of the glass by any reaction of the glass with any contaminant on the wire web, and the form of the mesh of the wire web is retained when the web has been incorporated in the ribbon of glass. The invention also comprehends sheets of glass cut from such a ribbon of wired glass.

I claim:

1. A method of continuously manufacturing a ribbon of wired glass in which a coated wire web consisting of longitudinal and transverse wires welded at their intersections and respectively extending along and across the ribbon and having a coating for protecting the wire from oxidation is fed into the molten glass from which the ribbon is formed, comprising continuously forming a ribbon component of glass, producing on the ribbon component a bloster of molten glass, feeding the coated web into one side of the bolter along a path adjacent and substantially parallel to the upper surface of the ribbon component so that the coated web is gradually heated by radiant heat from the ribbon component as it is advanced towards the bolster, the relative expansion between adjacent transverse wires at any time during said gradual heating and when the web enters the molten glass being insufficient to cause deformation of the web, and rolling the ribbon of wired glass from the other side of the bolster.

2. A method as described in claim 1, said coating being a compound from the group consisting of zinc phosphate and calcium metaphosphate.

3. A method of continuously manufacturing a ribbon of wired glass comprising continuously coating a steel wire web consisting of longitudinal and transverse wires welded at their intersections and respectively extending along and across the direction of advance of the web, with a protective coating compound selected from the group consisting of zinc phosphate and calcium metaphosphate, and gradually heating the coated web as it is advanced prior to incorporation into the molten glass in such a way that the relative expansion between adjacent transverse wires of the web at any time during the heating of the web and when the web is incorporated in the molten glass is insufficient to cause deformation of the web.

4 A method according to claim 3, wherein the wire web is coated by passing it through a bath of phosphoric acid containing said protective coating compound.

References Cited by the Examiner
UNITED STATES PATENTS

| | | | |
|---|---|---|---|
| 1,489,822 | 4/1924 | Crowley | 65—50 |
| 1,816,424 | 7/1931 | Elsey | 65—50 X |
| 2,076,869 | 4/1937 | Tanner | 117—53 X |
| 2,873,556 | 2/1959 | Hainke | 65—32 |
| 2,980,553 | 4/1961 | Sullivan | 117—53 X |

DONALL H. SYLVESTER, *Primary Examiner.*

R. LINDSAY, *Assistant Examiner.*